US010256986B2

(12) United States Patent
Thiruvenkatachari et al.

(10) Patent No.: US 10,256,986 B2
(45) Date of Patent: Apr. 9, 2019

(54) RECOVERING MISSED MULTIMEDIA BROADCAST AND MULTICAST SERVICE DATA IN A MULTICAST BROADCAST SINGLE FREQUENCY NETWORK

(71) Applicant: Samsung Electronics Co., Ltd., Gyeonggi-do (KR)

(72) Inventors: Balaji Srinivasan Thiruvenkatachari, Bangalore (IN); Sivashankar Sekar, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 173 days.

(21) Appl. No.: 14/821,304

(22) Filed: Aug. 7, 2015

(65) Prior Publication Data

US 2016/0094352 A1    Mar. 31, 2016

(30) Foreign Application Priority Data

Sep. 29, 2014 (IN) ............................ 4835/CHE/2014

(51) Int. Cl.
*H04W 28/04* (2009.01)
*H04L 12/18* (2006.01)
*H04L 1/22* (2006.01)
*H04L 1/00* (2006.01)

(52) U.S. Cl.
CPC ................ *H04L 12/18* (2013.01); *H04L 1/22* (2013.01); *H04W 28/04* (2013.01); *H04L 2001/0093* (2013.01)

(58) Field of Classification Search
CPC ..... H04L 12/18; H04L 1/22; H04L 2001/0093; H04W 28/04
See application file for complete search history.

(56) References Cited

U.S. PATENT DOCUMENTS

| | | | |
|---|---|---|---|
| 8,401,575 B2 | 3/2013 | Fischer et al. | |
| 2006/0168504 A1* | 7/2006 | Meyer | H04L 1/0026 714/799 |
| 2008/0240011 A1 | 10/2008 | Kim et al. | |
| 2008/0311926 A1* | 12/2008 | Fischer | H04W 72/005 455/452.1 |
| 2010/0080199 A1* | 4/2010 | Jim | H04W 72/087 370/338 |
| 2010/0172423 A1* | 7/2010 | Chrabieh | H04L 27/2613 375/260 |

(Continued)

*Primary Examiner* — Nicholas Sloms
*Assistant Examiner* — Hai-Chang Hsiung
(74) *Attorney, Agent, or Firm* — The Farrell Law Firm, P.C.

(57) ABSTRACT

A system and method for recovering missed Multimedia Broadcast and Multicast Service (MBMS) data frames in a Multicast Broadcast Single Frequency Network (MBSFN) is provided. The method includes storing a first set of Service Data Units (SDUs) in a first Radio Link Control (RLC) buffer, wherein the first set of SDUs is broadcasted using a first set of MBMS data frames from a first eNB, storing a second set of SDUs in a second RLC buffer, wherein the second set of SDUs is broadcasted using a second set of MBMS data frames from a second eNB, and comparing the first set of MBMS data frames associated with the first set of SDUs with the second set of MBMS data frames associated with the second set of SDUs to recover the missed MBMS data frame in the first set of RLC SDUs received from the first eNB.

6 Claims, 8 Drawing Sheets

(56) References Cited

U.S. PATENT DOCUMENTS

2011/0044225 A1 2/2011 Rinne et al.
2015/0304378 A1* 10/2015 Bi .................... H04L 65/4076
 370/329

* cited by examiner

RECOVERING MISSED MULTIMEDIA BROADCAST AND MULTICAST SERVICE DATA IN A MULTICAST BROADCAST SINGLE FREQUENCY NETWORK

PRIORITY

This application claims priority under 35 U.S.C. § 119(a) to an Indian Patent Application filed in the Indian Property Office on Sep. 29, 2014 and assigned Serial No. 4835/CHE/2014, the entire disclosure of which is incorporated herein by reference.

BACKGROUND

1. Field of the Disclosure

The present disclosure relates generally to wireless communication systems, and more particularly to, a method and system for recovering missed Multimedia Broadcast and Multicast Service (MBMS) data frames in a Multicast Broadcast Single Frequency Network (MBSFN).

2. Description of the Related Art

A MBMS is a service that provides broadcasting and multicasting services to mobile phones. To support the MBMS, the Long Term Evolution (LTE) offers the possibility to transmit the MBMS over a Multimedia Broadcast multicast service over Single Frequency Network (MBSFN). The MBMS signals pass through a wireless channel over an application layer, a plurality of middle layers, and a physical layer. The MBMS signals are broadcast data and there is no Automatic Repeat Request (ARQ) or Hybrid ARQ (HART) performed. Further, there is a possibility that the MBSFN data can be lost or missed due to channel conditions or due to user equipment specific operations (e.g., when the user equipment is tuned to other frequencies for measurement, and the like), which may impact the user experience.

Therefore, there exists a need for a robust system and method for detecting and correcting missed MBMS data frames in a MBSFN.

SUMMARY

An aspect of the present disclosure provides a method for recovering missed MBMS data frames in a MBSFN comprising a plurality of evolved Node B (eNBs). The method includes storing a first set of Service Data Units (SDUs) in a first Radio Link Control (RLC) buffer, wherein the first set of SDUs is broadcasted using a first set of data frames from a first eNB, which is part of a first MBSFN area, storing a second set of SDUs in a second RLC buffer, wherein the second set of SDUs is broadcasted using a second set of data frames from a second eNB, which is part of a second MBSFN area, which is different from the first MBSFN area of the first eNB, and comparing the first set of data frames associated with the first of set SDUs with the second set of data frames associated with the second set of SDUs to recover at least one missed MBMS data frame in the first set of RLC SDUs.

An aspect of the present disclosure provides a User Equipment (UE) for recovering missed MBMS data frames in a MBSFN comprising a plurality of eNBs. The UE is configured to store a first set of SDUs in a RLC buffer, wherein the first set of SDUs is broadcasted using a first set of data frames from a first eNB, which is part of a first MBSFN area, store a second set of SDUs in a second RLC buffer, wherein the second set of SDUs is broadcasted using a second set of data frames from a second eNB, which is part of a second MBSFN area, which is different from the first MBSFN area of the first eNB, and compare the first set of data frames associated with the first of set SDUs with the second set of data frames associated with the second set of SDUs to recover at least one missed MBMS data frame in the first set of RLC SDUs received from the first eNB, which is part of the first MBSFN area.

Another aspect of the present disclosure provides a computer program product comprising a computer executable program code recorded on a computer readable non-transitory storage medium, wherein the computer executable program code when executed causing the actions including storing a first set of SDUs in a first RLC buffer, wherein the first set of SDUs is broadcasted using a first set of data frames from a first eNB, which is part of a first MBSFN area, storing a second set of SDUs in a second RLC buffer, wherein the second set of SDUs is broadcasted using a second set of data frames from a second eNB, which is part of a second MBSFN area different from the first MBSFN area of the first eNB, and comparing the first set of data frames associated with the first of set SDUs with the second set of data frames associated with the second set of SDUs to recover at least one missed MBMS data frame in the first set of RLC SDUs.

BRIEF DESCRIPTION OF THE DRAWINGS

The above and other aspects, features, and advantages of certain embodiments disclosed herein will be more apparent from the following detailed description taken in conjunction with the accompanying drawings, in which.

DETAILED DESCRIPTION OF EMBODIMENTS OF THE PRESENT DISCLOSURE

Figure 1:
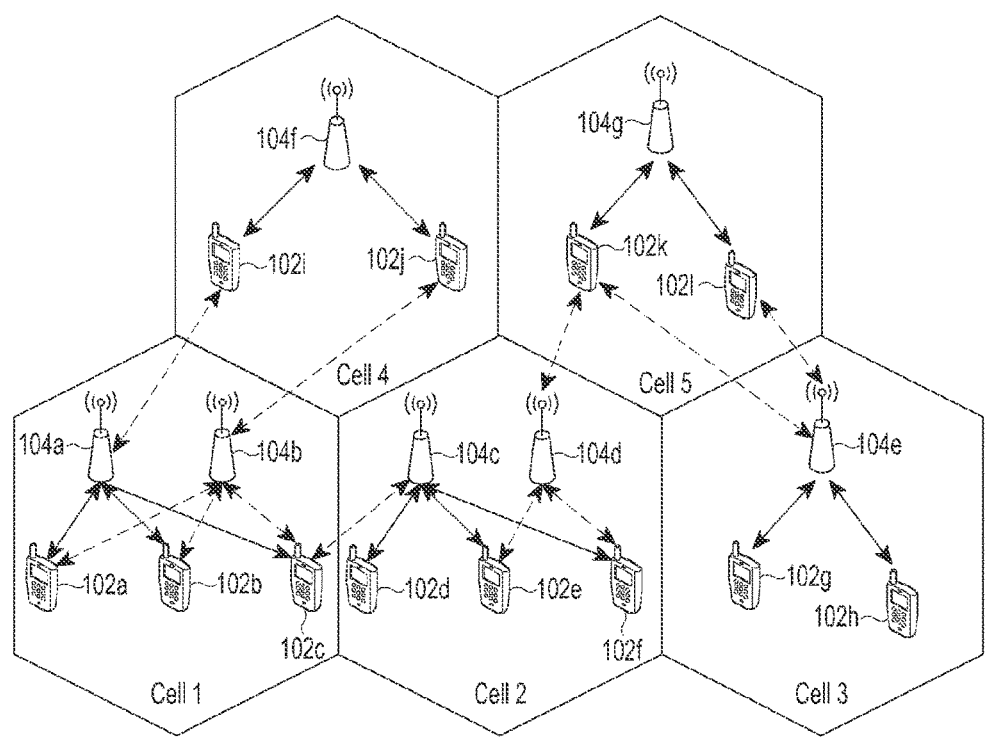
FIG. 1 is a diagram illustrating a wireless network providing an MBMS in an MBSFN within an LTE area, in accordance with an embodiment of the present disclosure.

Hereinafter, embodiments of the present disclosure are described in detail with reference to the accompanying drawings. Those of ordinary skill in the art will recognize that various changes and modifications of the embodiments described herein can be made without departing from the scope of the present disclosure. In addition, descriptions of well-known functions and constructions may be omitted for clarity and conciseness. The same reference symbols are used throughout the drawings to refer to the same or like parts.

It should be noted that various embodiments described below may be applied or used individually or in combination.

The present specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As noted above, there exists a need for a robust system and method for detecting and correcting missed MBMS data frames in an MBSFN, and such a system and method are described herein. More particularly, the embodiments described herein provide a system and method for recovering missed MBMS data frames in an MBSFN. The method includes storing a first set of SDUs in a first RLC buffer. The first set of SDUs is broadcasted using a first set of data frames from a first eNB, which is part of a first MBSFN area. Further, the method includes storing a second set of SDUs in a second RLC buffer. The second set of SDUs is broadcasted using a second set of data frames from a second eNB, which is part of a second MBSFN area different from the first MBSFN area. Furthermore, the method includes comparing the first set of data frames associated with the first of set SDUs with the second set of data frames associated with the second set of SDUs to recover missed MBMS data frames in the first set of RLC SDUs received from the first eNB, which is part of the first MBSFN area.

Figure 2:
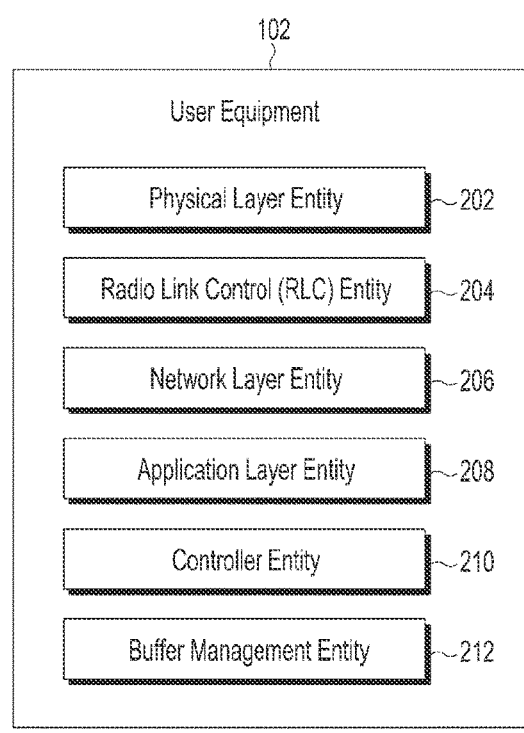
FIG. 2 is a block diagram illustrating various modules of a User Equipment (UE), in accordance with an embodiment of the present disclosure.

FIG. 1 is a diagram illustrating a wireless network providing an MBMS in an MBSFN within an LTE area, in accordance with an embodiment of the present disclosure. The wireless network includes a number of Evolved Node B (eNBs) and other network entities. An eNB can be a base station or an access point that communicates with one or more UEs 102 (FIG. 2). Each eNB 104a and 104b may provide communication coverage for a particular geographic area. For example, the eNBs 104a, 104b in a cell 1 may form a first MBSFN area and the eNBs 104c and 104d in a cell 2 may form a second MBSFN area. In the 3rd Generation Partnership Project (3GPP), the term "cell" can refer to a coverage area of an eNB or an eNB subsystem serving this coverage area, depending on the context in which the term is used.

The wireless network described herein can be a homogenous network, a heterogeneous network, or a combination thereof that includes eNBs of different types, e.g., macro eNBs, Pico eNBs, Femto eNBs, relays, and the like. These different types of eNBs may have different transmit power levels, different coverage areas, and different impact on interference in the wireless network.

Further, the wireless network can support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The method and system described herein can be used for both synchronous and asynchronous operation.

Each eNB in the MBSFN area synchronously transmits the same MBMS control information and data. Each area may support broadcast, multicast, and unicast services. The unicast service is a service intended for a specific user, e.g., a voice call. The multicast service is a service that may be received by a group of users, e.g., a subscription video service. The broadcast service is a service that may be received by all users, e.g., news broadcast. For example, the first MBSFN area may support the first MBMS broadcast service, such as by providing a particular news broadcast to the UE 102. The second MBSFN area may support a second MBMS broadcast service. Each MBSFN area supports a plurality of physical multicast channels (PMCH), where each PMCH corresponds to a multicast channel (MCH). Each MCH can multiplex a plurality of multicast logical channels. Each MBSFN area may have one multicast control channel (MCCH).

The UE 102 can be stationary or mobile. The UE 102 described herein can be for example, but not limited to, a terminal, a mobile station, a subscriber unit, a station, a cellular phone, a Personal Digital Assistant (PDA), a smart phone, a wireless modem, a wireless communication device, a handheld device, a laptop computer, a cordless phone, a Wireless Local Loop (WLL) station, or other mobile entities. The UE 102 may be able to communicate with different eNBs using multiple radio carriers. The UE 102 is configured to receive MBSFN frames transmitted with a frequency and timing that is compliant with the transmissions from different eNBs.

As is known, the MBMS is a Point-to-Multipoint (PTM) interface specification designed to provide efficient delivery of broadcast and multicast services within 3GPP cellular networks. Examples of MBMS interface specifications include those described in Universal Mobile Telecommunications System (UMTS) and LTE communication specifications. For broadcast transmission across multiple cells, the specifications define transmission over single-frequency network configurations. Intended applications include mobile TV, news, radio broadcasting, file delivery, emergency alerts, and the like. When services are broadcasted by the MBMS, all cells inside an MBSFN area normally transmit the same MBMS service and MBMS frame data. The MBSFN frame signal can be generated by equipment within or connected to the LTE or may be generated by other remotely located equipment. Further, the MBMS frame can be receivable by the UEs 102 within the MBSFN region where the UEs 102 typically are receiving wireless service from different eNBs inside. Various types of information may be included in the MBSN frame. Unlike conventional systems, the UE 102 is configured to store the same MBSN frames received from various eNBs to recover the missed MBSN frame data.

FIG. 1 shows a limited overview of the wireless network, but it is to be understood that other embodiments are not limited thereto. Further, the wireless network can include any number of modules along with other hardware and/or software components to communicate with each other. For example, a component can be, but not limited to, a process running in a controller or processor, an object, an executable process, a thread of execution, a program, or a computer. By way of illustration, both an application running on a device and the device itself can be a component.

Furthermore, the techniques described herein may be used for various wireless communication networks such as Code Division Multiple Access (CDMA), Time Division Multiple Access (TDMA), Frequency Division Multiple Access (FDMA), Orthogonal FDMA (OFDMA), Single Carrier FDMA (SC-FDMA) and other networks. The terms "network" and "system" are often used interchangeably. A CDMA network may implement a radio technology such as Universal Terrestrial Radio Access (UTRA), CDMA 2000, etc. UTRA includes Wideband CDMA (WCDMA) and other variants of CDMA. CDMA 2000 covers IS-2000, IS-95 and IS-856 standards. A TDMA network may implement a radio technology such as Global System for Mobile communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from 3GPP. CDMA 2000 and UMB are described in documents from 3GPP2". The techniques described herein may be used for the wireless networks and radio technologies mentioned above as well as other wireless networks and radio technologies. For convenience and clarity, certain aspects of the techniques are described below for LTE, and LTE terminology is used throughout the description.

FIG. 2 is a block diagram illustrating various modules of the UE 102, in accordance with an embodiment of the present disclosure. The UE 102 includes a physical layer entity 202, an RLC entity 204, a network layer entity 206, an application layer entity 208, a controller entity 210, and a buffer management entity 212.

The physical layer entity 202 is configured to perform MBMS data processing based on a physical layer protocol. The RLC entity 204 is configured to perform MBMS data processing based on a RLC protocol. The network layer entity 206 is configured to perform MBMS data processing based on a network layer protocol. The application layer entity 208 is configured to perform MBMS data processing based on an application layer protocol. The controller entity 210 is configured to operate with the physical layer entity 202, the RLC entity 204, the network layer entity 206, the application layer entity 208, and the buffer management entity 212.

The physical layer protocol entity 202 allocates a frame of a physical channel for transmitting the specific MBMS service. The physical layer entity 202 determines the frame for the specific MBMS service and transfers the corresponding frame allocation information to the RLC entity 204.

The RLC entity 204 supports a reliable data transmission and performs a function of segmentation and concatenation of an RLC SDU coming from the physical layer entity 202, where the SDU is a unit of data that has been passed down from an OSI layer to a lower layer and that has not yet been encapsulated into a protocol data unit (PDU) by the lower layer. The RLC SDU transferred from the physical layer entity 202 is adjusted in its size according to a throughput capacity at the RLC layer, to which header information is added, and then transferred in a form of a PDU to the application layer entity 208. The RLC entity 204 is provided with the buffer management entity 212 for storing the RLC SDU coming from the physical layer entity 202. The network layer entity 206 and the application layer entity 208 are provided with the buffer management entity 212 for storing the RLC PDU received from the RLC entity 204.

The RLC entity 204 is configured to receive a first set of SDUs broadcasted using the first set of data frames from the first eNB 104*a*, which is part of the first MBSFN area, i.e., in cell 1. The RLC entity 204 is configured to store the first set of SDUs in a first RLC buffer using the buffer management entity 212. The RLC entity 204 is configured to receive the second set of SDUs broadcasted using the second set of data frames from the second eNB 104*b*, which is part of the second MBSFN area different from the first MBSFN area of the first eNB 104*a*. The RLC entity 204 is configured to store the first set of SDUs in a second RLC buffer using the buffer management entity 212.

The controller entity 210 is configured to compare the first set of data frames associated with the first set of SDUs with the second set of data frames associated with the second set of SDUs to recover the missed MBMS data frame in the first set of RLC SDUs received from the first eNB 104*a* based on a SYNC protocol across the first MBSFN area. The SYNC protocol enables the MBMS data flow synchronization across the eNBs, which is part of the different MBSFN areas, by aligning the MBMS data frame with a start of MCH modification period to identify the missed data frame.

The network layer entity 206 is configured to receive a first set of data packets including the first set of data frames associated with the first set of SDUs received from the RLC entity 204. The network layer entity 206 is configured to receive a second set of data packets including the second set of data frames associated with the second set of SDUs received from the RLC entity 204. The buffer management entity 212 stores the first set of packets and the second set of packets at a particular network layer. Each of the first set and second set of data packets is associated with a sequence number of an IP header.

The controller entity 210 is configured compare the sequence number of the IP header associated with the first set of data packets and the sequence number of the IP header associated with the second set of data packets to determine whether to store the received first set and second set of data packets and to detect missed or duplicate packets. The first set of data packets may comprise at least one of SDUs and PDUs.

Figure 3:
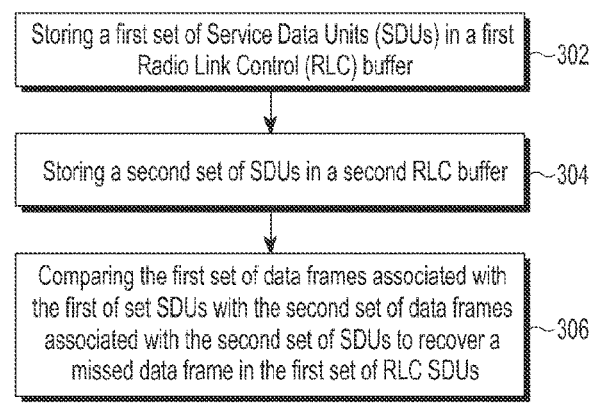
FIG. 3 is a flow chart illustrating a method for recovering missed MBMS data frames in the MBSFN, in accordance with an embodiment of the present disclosure.

FIG. 3 is a flow chart illustrating a method for recovering missed MBMS data frames in the MBSFN, in accordance with an embodiment of the present disclosure. The method described herein provides a basis for a control program which can be easily implemented using a microcontroller, a microprocessor, or an equivalent thereof.

At step 302, the first set of SDUs is stored in the first RLC buffer. The RLC entity 204 receives the first set of SDUs from the first eNB 104*a* and stores the first set of SDUs, in the first RLC buffer, using the buffer management entity

212. The first set of SDUs is broadcasted using the first set of data frames from the first eNB 104a, which is a part of the first MBSFN area.

At step 304, the second set of SDUs is stored in the second RLC buffer. The RLC entity 204 receives the second set of SDUs from the second eNB and stores the second set of SDUs in the second RLF buffer, using the buffer management entity 212. The second set of SDUs is broadcasted using the second set of data frames from the second eNB 104b, which is part of the second MBSFN area, and is different from the first MBSFN area of the first eNB 104a. The second eNB 104b may provide the MBMS service from within the cell or neighboring cells in the MBSFN.

At step 306, the first set of data frames associated with the first of set SDUs is compared with the second set of data frames associated with the second set of SDUs to recover the missed MBMS data frame in the first set of RLC SDUs received from the first eNB 104a, which is part of the first MBSFN area.

The controller entity 210 compares the first set of data frames associated with the first of set SDUs with the second set of data frames associated with the second set of SDUs to recover the missed MBMS data frame in the first set of RLC SDUs received from the first eNB, which is part of the first MBSFN area.

The controller entity 210 determines, at an upper layer, a mismatch between the first set of data frames associated with the first set of SDUs and the second set of data frames associated with the second set of SDUs received from a lower layer based on the SYNC protocol across the MBSFN area, which enables MBMS data flow synchronization across the eNBs. The upper layer is the RLC layer entity 204 and the lower layer is the physical layer entity 202. The SYNC protocol across the MBSFN area enables MBMS data flow synchronization across the eNBs 104a-104g, which are part of different MBSFN areas, by aligning the MBMS data frame with a start of multicast channel (MCH) modification period to identify the missed data frame.

The controller entity 210 determines, at the upper layer, a mismatch between sequence numbers of the IP header associated with the data packet associated with the first set of data frames received from the lower layer to identify the missed data frame. The upper layer is the network layer entity 206 and the lower layer is the RLC layer entity 204. Alternatively, the upper layer may be the application layer entity 208 and the lower layer may be the RLC layer entity 204.

The various actions, acts, blocks, and steps of the method described herein may be performed in the order presented, in a different order or simultaneously. Further, some actions, acts, blocks, steps may be omitted, added, modified, and skipped, without departing from the scope of the present disclosure.

Figure 4A:
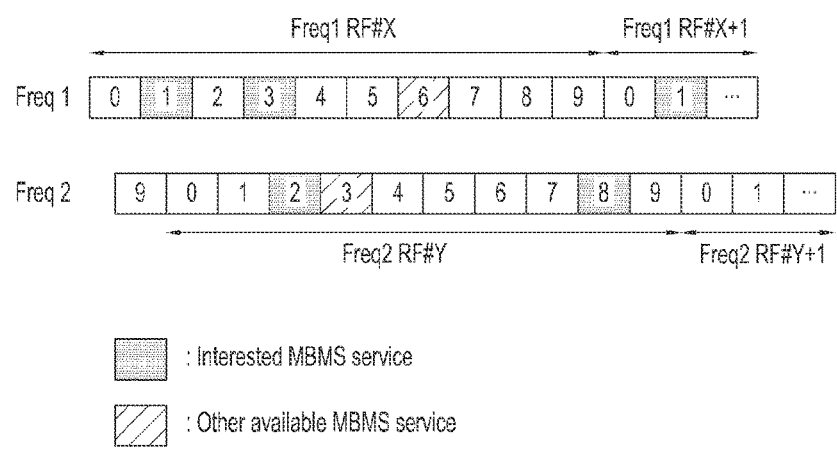
FIG. 4A is a diagram illustrating an example of MBSFN scheduling across carriers for interested service, in accordance with an embodiment of the present disclosure.

FIG. 4A is a diagram illustrating an example of MBSFN scheduling across carriers for interested service, in accordance with an embodiment of the present disclosure. In order to improve the resources utilization rate of the MBMS in the MBSFN, a carrier frequency may support MCHs, in such a case a specific MCH-distributed physical resource may adopt a specific pattern of sub-frames, which is known as an MCH sub-frame allocation pattern (MSAP). A plurality of MBMS services may be mapped to the same MCH, and the MBMS services included by the MCH are part or the same MBSFN area. As illustrated in FIG. 4A, a sequence of frames is labeled 0, 1, 2, 3, 4, 5, 6, 7, 8, and 9 in a first frequency channel, in which the interested MBMS service is shown labeled 1 and 3 in the first frequency channel and another available MBMS service is labeled 6 in the first frequency channel. Similarly, an interested MBMS service is shown labeled 2 and 8 in the second frequency channel and another available MBMS service is labeled 3 in the second frequency channel.

Figure 4B:
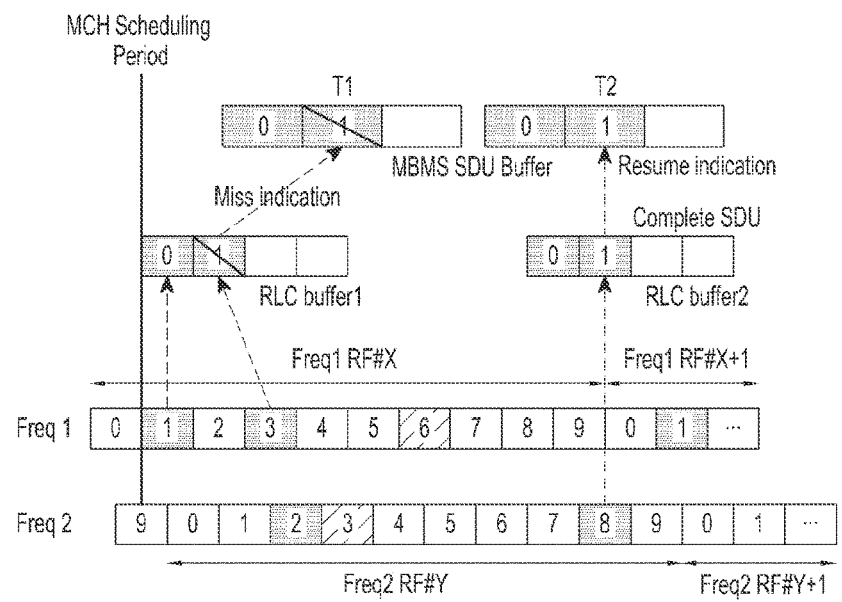
FIG. 4B is diagram illustrating an example of recovering missed MBMS data through a Radio Link Control (RLC) Service Data Units (SDUs) using SYNC control as reference points, in accordance with an embodiment of the present disclosure.

FIG. 4B is diagram illustrating an example of recovering missed MBMS data through a Radio Link Control (RLC) Service Data Units (SDUs) using SYNC control as reference points, in accordance with an embodiment of the present disclosure. The RLC entity 204 receives the first set of SDUs and the second set of SDUs from the multiple MBSFNs within the same cell/neighboring cells. The first set of SDUs is broadcasted using the first set of data frames from the first eNB 104a, which is part of the first MBSFN area, and the second set of SDUs is broadcasted using the second set of data frames from the second eNB 104b, which is part of the second MBSFN area, and is different from the first MBSFN area of the first eNB 104a. The buffer management entity 212 stores the first set of SDUs and the second set of SDUs. The controller entity 210 compares the first set of data frames associated with the first of set SDUs with the second set of data frames associated with the second set of SDUs to recover the missed MBMS data frame in the first set of RLC SDUs received from the first eNB 104 abased on a SYNC protocol across the MBSFN area which enables MBMS data flow synchronization across the eNBs 104a-104g by aligning the MBMS data frame with a start of the MCH modification period to identify the missed data frame.

In FIG. 4B, the buffer management entity 212 stores the first set of SDUs (i.e., label 0 and missed label 1) and the second set of SDUs (i.e., label 0 and label 1). The controller entity 210 compares the first set of SDUs (i.e., label 0 and missed label 1) with the second set of SDUs (i.e., label 0 and label 1) to identify the missed label 1 in the first channel based on a SYNC protocol across the MBSFN area.

Figure 4C:
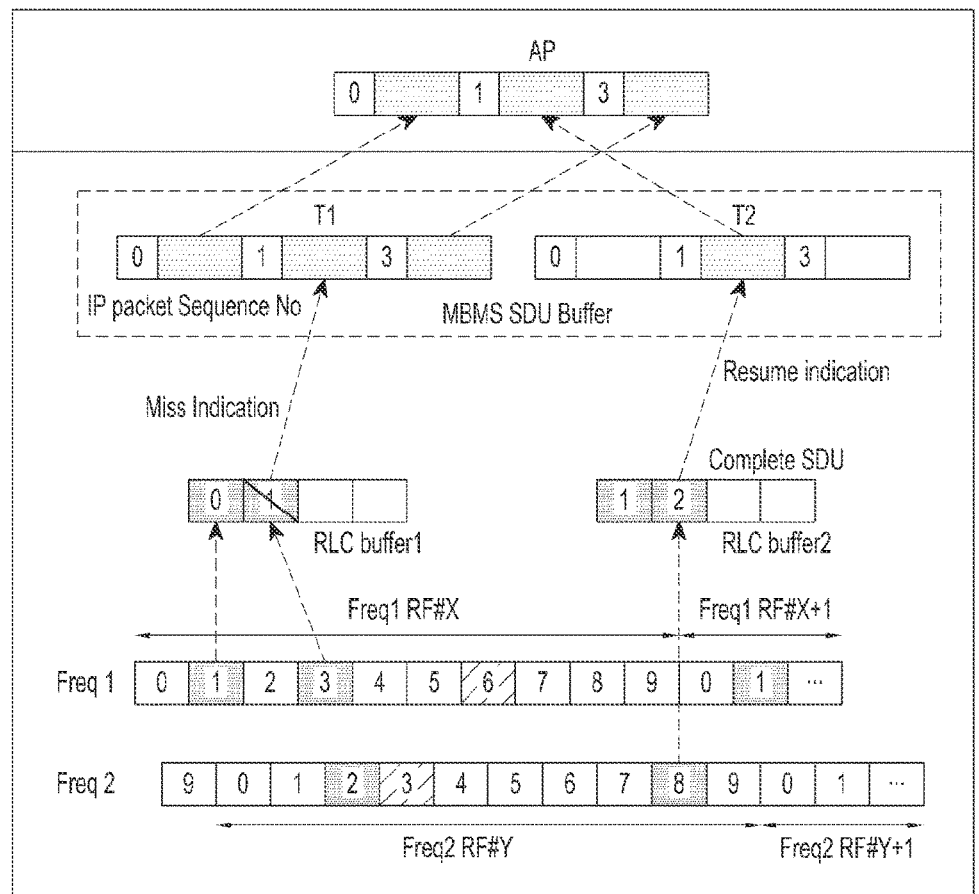
FIG. 4C is a diagram illustrating an example of recovering missed MBMS data using an Internet Protocol (IP) header associated with data packets, in accordance with an embodiment of the present disclosure.

FIG. 4C is a diagram illustrating an example of recovering missed MBMS data using an Internet Protocol (IP) header associated with data packets, in accordance with an embodiment of the present disclosure. The network layer entity 206 receives the first set of data frames associated with the first set of SDUs and the second set of data frames associated with the second set of SDUs received from the RLC entity 204. The buffer management entity 212 stores the first set of data frames associated with the first set of SDUs and the second set of data frames associated with the second set of SDUs received from the RLC entity 204. The buffer management unit entity 212 stores the sequence number of the IP header associated with the first set of data packet. The buffer management entity 212 stores the sequence number of the IP header associated with the second set of data packet. For example, the buffer management entity 212 receives the label 0 and misses the label 1 in a carrier control channel 1, and the buffer management unit receives the label 0 and the label 1 in a carrier control channel 2. The controller entity 210 compares the sequence numbers of the IP header associated with the first set and second set of data packets to determine if the label 1 of the carrier control channel 1 is missed. The buffer management entity 212 can discard the label 0 of the carrier control channel 2 to improve memory usage of the UE 102, thereby eliminating the need for a buffer large enough to store all of the data frames during the error recovery. As can be appreciated, this can eliminate processing delays during error recover.

Figure 4D:
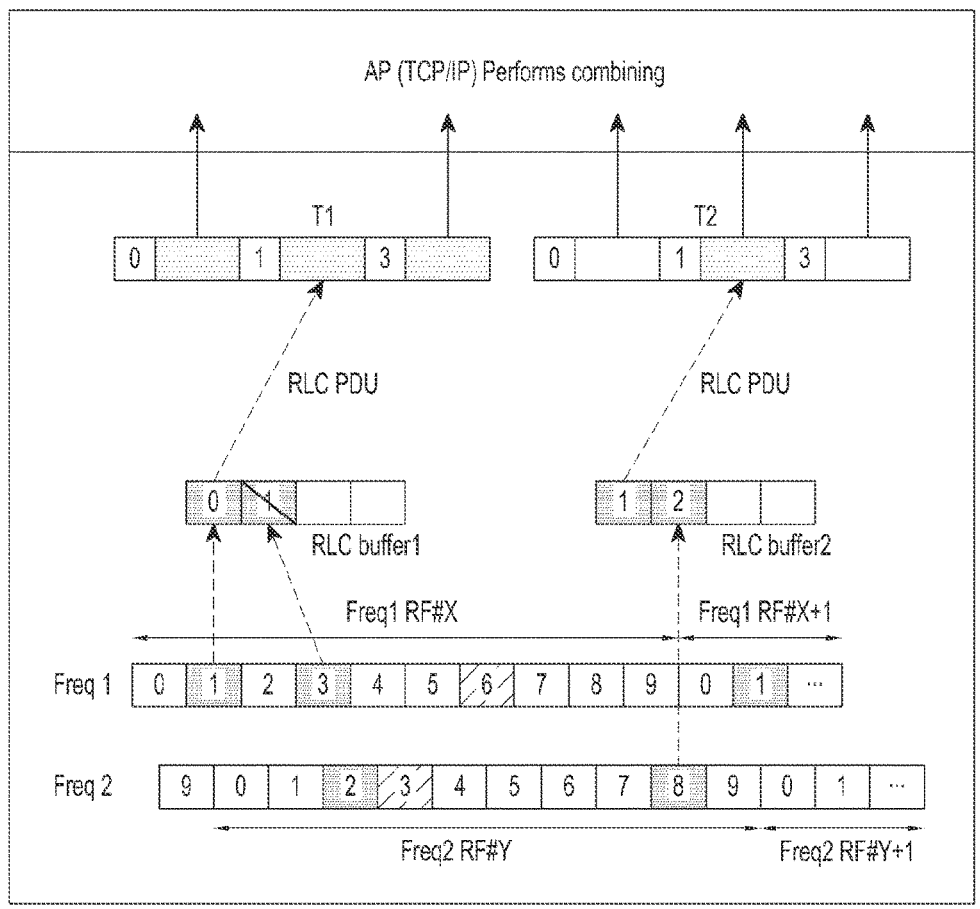
FIG. 4D is a diagram illustrating an example of recovering missed MBMS data using the IP header associated with data packets error correction at an application layer, in accordance with an embodiment of the present disclosure.

FIG. 4D is a diagram illustrating an example of recovering missed MBMS data using the IP header associated with data packets error correction at an application layer, in accordance with an embodiment of the present disclosure.

As shown in the FIG. 4D, at the application layer, the buffer management entity 212 receives the label 0 and misses the label 1 from the carrier control channel 1, and the buffer management unit receives the label 0 and the label 1 from the carrier control channel 2. The controller entity 210 compares the sequence numbers of the IP header associated with the first set and second set of data packet to determine if the label 1 of the carrier control channel 1 is missed at the application layer.

Figure 5:
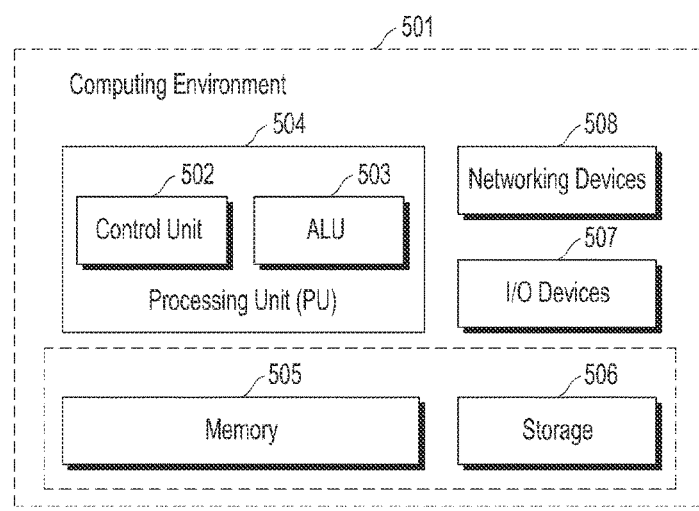
FIG. 5 is a block diagram illustrating a computing environment implementing the system and method for recovering missed MBMS data frames in the MBSFN, in accordance with an embodiment of the present disclosure.

FIG. 5 is a block diagram illustrating a computing environment implementing the system and method for recovering missed MBMS data frames in the MBSFN, in accordance with an embodiment of the present disclosure. A computing environment 501 comprises at least one processing unit 504 that is equipped with a control unit 502, an Arithmetic Logic Unit (ALU) 503, a memory 505, a storage unit 506, a plurality of networking devices 508 and a plurality Input output (I/O) devices 507. The processing unit 504 is responsible for processing the instructions of the algorithm. The processing unit 504 receives commands from the control unit 502 in order to perform its processing. Further, any logical and arithmetic operations involved in the execution of the instructions are computed with the help of the ALU 503.

The overall computing environment 501 can be composed of multiple homogeneous and/or heterogeneous cores, multiple CPUs of different kinds, special media and other accelerators. The processing unit 504 is responsible for processing the instructions of an algorithm. Further, the processing unit 504 may be located on a single chip or over multiple chips.

The algorithm, which comprises instructions and codes required for the implementation of the method described herein, are stored in either the memory unit 505 and/or the storage 506. At a time of execution, the instructions may be fetched from the corresponding memory 505 and/or storage 506 and executed by the processing unit 504.

In case of any hardware implementations various networking devices 508 or external I/O devices 507 may be connected to the computing environment 501 to support the implementation through the networking devices 508 and/or the I/O device devices 507.

The embodiments disclosed herein can be implemented through at least one software program running on at least one hardware device and can perform the network management functions to control the elements described herein. The elements shown in FIGS. 1-5 include blocks which can be at least one of a hardware device, or a combination of hardware device and software module.

The various devices, modules, and the like described herein may be enabled and operated using hardware circuitry, for example, complementary metal oxide semiconductor based logic circuitry, firmware, software and/or any combination of hardware, firmware, and/or software embodied in a machine readable medium.

While the present invention has been shown and described with reference to various embodiments thereof, it should be understood by those skilled in the art that many variations and modifications of the method and apparatus described herein will still fall within the spirit and scope of the present invention as defined in the appended claims and their equivalents.

What is claimed is:

1. A method for recovering missed multimedia broadcast and multicast service (MBMS) data frames in a multicast broadcast single frequency network (MBSFN) area comprising a plurality of evolved node B (eNBs), the method comprising:
    storing, at a radio link control (RLC) entity, first service data units (SDUs) in a first RLC buffer, wherein the first SDUs are broadcasted using first MBMS data frames from a first eNB, which is a first part of the MBSFN area;
    storing, at the RLC entity, second SDUs in a second RLC buffer, wherein the second SDUs are broadcasted using second MBMS data frames from a second eNB, which is a second part of the MBSFN area, which is different from the first part of the MBSFN area;
    comparing, at a controller entity, a first sequence number of an interne protocol (IP) header corresponding to each of the first SDUs with a second sequence number of an IP header corresponding to each of the second SDUs;
    determining, at the controller entity, whether the first sequence number and the second sequence number is not matched,
    obtaining, at the controller entity, one or more SDUs not matched between the first sequence number and the second sequence number as at least one missed SDU, if the first sequence number and the second sequence number is not matched; and
    recovering, at the controller entity, the at least one missed SDU.

2. The method of claim 1, wherein comparing the first sequence number of the IP header comprises:
    determining, at the controller entity, whether the first sequence number and the second sequence number is not matched based on a SYNC protocol across the MBSFN to enable MBMS data flow synchronization across the first eNB and the second eNB, which aligns the MBMS data frames with a start of a multicast channel (MCH) modification period.

3. A user equipment (UE) for recovering missed multimedia broadcast and multicast service (MBMS) data frames in a multicast broadcast single frequency network (MBSFN) comprising a plurality of evolved node B (eNBs), the UE is configured to:
    store, at a radio link control (RLC) entity, first Service Data Units (SDUs) in a first RLC buffer, wherein the first SDUs are broadcasted using first MBMS data frames from a first eNB, which is a first part of the MBSFN area;
    store, at the RLC entity, second SDUs in a second RLC buffer, wherein the second SDUs are broadcasted using second MBMS data frames from a second eNB, which is a second part of the MBSFN area, which is different from the first part of the MBSFN area;
    compare, at a controller entity, a first sequence number of an internet protocol (IP) header corresponding to each of the first SDUs with a second sequence number of an IP header corresponding to each of the second SDUs;
    determine, at the controller entity, whether the first sequence number and the second sequence number is not matched;
    obtain, at the controller entity, one or more SDUs not matched between the first sequence number and the second sequence number as at least one missed SDU, if the first sequence number and the second sequence number is not matched;
    recover, at the controller entity, the at least one missed SDU.

4. The UE of claim 3, wherein the UE is further configured to:
 determine, at the controller entity, whether the first sequence number and the second sequence number is not matched, based on a SYNC protocol across the MBSFN to enable MBMS data flow synchronization across the first eNB and the second eNB, which aligns the MBMS data frames with a start of a multicast channel (MCH) modification period.

5. A computer program product comprising a computer executable program code recorded on a computer readable non-transitory storage medium, wherein the computer executable program code when executed causing the actions including:
 storing, at a radio link control (RLC) entity, first SDUs in a first RLC buffer, wherein the first SDUs are broadcasted using first MBMS data frames from a first eNB, which is a first part of the MBSFN area;
 storing, at the RLC entity, second SDUs in a second RLC buffer, wherein the second SDUs are broadcasted using second MBMS data frames from a second eNB, which is a second part of the MBSFN area, which is different from the first part of the MBSFN area;
 comparing, at a controller entity, a first sequence number of an internet protocol (IP) header corresponding to each of the first SDUs with a second sequence number of an IP header corresponding to each of the second SDUs;
 determining, at the controller entity, whether the first sequence number and the second sequence number is not matched;
 obtaining, at the controller entity, one or more SDUs not matched between the first sequence number and the second sequence number as at least one missed SDU, if the first sequence number and the second sequence number is not matched; and
 recovering, at the controller entity, the at least one missed SDU.

6. The computer program product of claim 5, wherein comparing the first sequence number of the IP header comprises:
 determining, at the controller entity, whether the first sequence number and the second sequence number is not matched based on a SYMC protocol across the MBSFN to enable MBMS data flow synchronization across the first eNB and the second eNB, which aligns the MBMS data frames with a start of a multicast channel (MCH) modification period.

* * * * *